Oct. 30, 1928.  
A. H. KATTERJOHN  
1,689,392  
CHUCK ROTATING MECHANISM  
Filed July 21, 1923
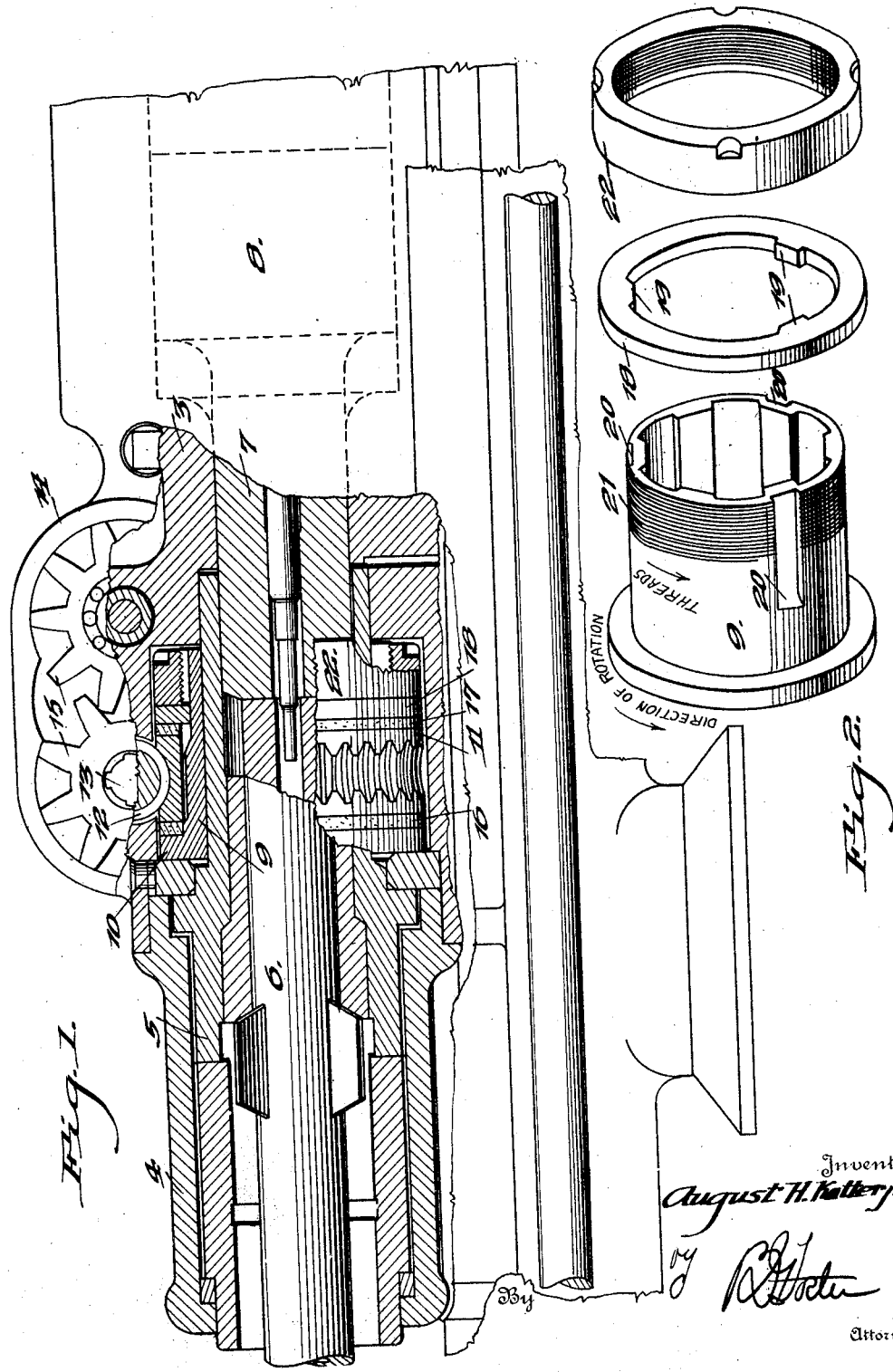

Patented Oct. 30, 1928.

1,689,392

UNITED STATES PATENT OFFICE.

AUGUST H. KATTERJOHN, OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE.

CHUCK-ROTATING MECHANISM.

Application filed July 21, 1923. Serial No. 652,996.

The present invention relates to driving means, the object being to provide an operating connection between the driving and driven members that will allow the movement of the former in case the latter is stopped by undue resistance, said means being simple in its character and involving an arrangement of parts that will automatically insure the proper driving engagement and the taking up of wear.

An embodiment of the invention as applied to rock drills, is illustrated in the accompanying drawings, wherein:—

Figure 1 is a longitudinal sectional view through the chuck portion of a rock drill showing the improved connection between the motor and the chuck of the drill.

Figure 2 is a detail perspective view of the mounting and friction clutch for the driving member.

In the embodiment disclosed, a suitable casing 3 is illustrated, including a housing 4, in which is located a rotary chuck 5 adapted to receive the rear end of a drill steel 6. This drill steel, as is well known, is adapted to be removably interlocked with the sleeve 5 so as to rotate therewith. The drill steel is operated on by the extension 7 of a reciprocatory hammer piston 8 actuated in any desired manner.

The rear portion of the chuck 5 has mounted on it a sleeve 9 provided at its front end with an outstanding flange 10, and rotatably mounted on said sleeve is a worm wheel 11. This worm wheel is engaged by the worm 12 carried by the shaft 13 of a rotary motor, consisting of a casing 14 with intermeshing gear pistons 15. Interposed between the worm wheel 11 and the flange 10 is a friction washer 16, preferably of fiber or other suitable material. Another friction washer 17 bears against the rear side of the worm wheel 11, and engaging the said friction washer 17 is a third washer 18 that is slidably mounted on the sleeve 9 and has inset lugs 19 engaging in longitudinal keyways 20 formed on the exterior of the sleeve 9.

The rear end of the sleeve 9 is externally threaded, as shown at 21 and the pitch of this thread is in the same direction as the direction of rotation of the sleeve and chuck by the rotary motor 14—15, as indicated in Figure 2. A nut 22 is adapted to be threaded on the rear end of the sleeve 9, and said nut bearing against the washer 18 serves to create a frictional holding action by means of the washers 16 and 17 that will normally cause the worm wheel 11 and sleeve 9 to rotate together.

By reason of the construction and the particular arrangement of the threads 21 with respect to the direction of rotation of the sleeve 9 and consequently of the chuck, it is found that a proper frictional connection will be obtained that will insure the rotation of the chuck by the motor, thereby turning the drill steel 6, while the same is being hammered upon by the piston 7—8. At the same time if excessive resistance to the rotation takes place, due, for example, to the drill steel becoming stuck in the drill hole, the driving motor may continue to rotate, inasmuch as the driving worm wheel 11 will turn by overcoming the frictional resistance to the independent movement of the said wheel with respect to the chuck. It has also been found that besides obtaining the desired frictional grip between the worm 11 and the chuck, wear of the parts is taken up by the automatic turning of the nut 22 on the sleeve 9. This may be explained by stating that while the rotation of the chuck is always in the same direction, the speed of the rotation is varied or made intermittent by the action of the hammer 7—8, for when said hammer strikes the drill steel and drives it against the bottom of the drill hole the rotation of the steel and therefore of the chuck is stopped or its speed reduced. The inertia of the nut, however, causes it to have a continued movement, particularly if there is any play that will allow the same and consequently it tends to tighten the parts. After a blow has been struck by the hammer and during the return movement thereof, the chuck is released from the resistance, and its movement again begins or is accelerated, but this action is apparently slower than the stoppage.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. The combination with a rotary driven sleeve member having an external annular shoulder, of a motor for rotating the sleeve member and including a worm shaft, a worm wheel slidable and rotatable on the sleeve and operated by the worm shaft, a friction washer interposed between the shoulder and the worm wheel, a second friction washer that bears against the opposite side of the wheel to the first mentioned friction washer, the sleeve adjacent to said second washer having a thread, the pitch of which is in the direction of rotation of the sleeve, and a nut threaded on said sleeve and automatically operating against the adjacent washer and the worm wheel and first washer to clamp all sufficiently tight and against the shoulder to effect the rotation of the sleeve and to take up wear.

2. The combination with a rotary driven member, of a rotary driving member surrounding the same and rotatable with respect thereto, operating means for rotating the driving member and a friction clutch for movably holding the two members against rotation, including a nut independent of the operating means and carried by the driven member, and threads on the driven member engaged by the nut and extending in a direction to cause the nut to automatically move along the driven member and maintain a frictional clutching engagement between the driving and driven members and take up wear therebetween.

3. The combination with a rotatable driven member, of a driving gear journaled thereon, operating means engaged with the gear for rotating it in a predetermined direction, a nut on the driven member for creating friction on the gear, coacting threads on the nut and driven member for causing the nut to be automatically moved on the driven member toward the gear when the speed of rotation of the driven member varies, and means for causing such intermittent variation of speed.

4. The combination with a rotatable driven member, of a driving gear journaled thereon, operating means engaged with the gear for rotating it, clamping abutments on the driven member on opposite sides of the gear, one being slidable, a friction nut on the driven member, coacting threads on the nut and drive member for causing the nut to be automatically moved on the driven member toward the gear when the speed of rotation of the driven member varies, said nut acting upon the slidable clamping abutment, and means for causing such intermittent variation of speed.

5. The combination with a rotatable drill steel receiving chuck, of a driving gear rotatably mounted thereon, a motor geared to the gear for rotating it, means for hammering on a drill steel placed in the chuck and causing intermittent alteration in the speed of rotation of the chuck, and means mounted on the chuck and frictionally engaging the gear to cause it to normally rotate the chuck, said means including a device movably mounted on the chuck and means for causing said device to be automatically moved on the chuck bodily toward the gear by the intermittent change of speed of the chuck to maintain said frictional engagement and take up wear.

6. The combination with a rotatable drill steel receiving chuck, of a driving gear rotatably mounted thereon, a motor geared to the gear for rotating it in a predetermined direction, means for hammering on a drill steel placed in the chuck and causing intermittent alteration in the speed of rotation thereof, relatively movable elements on opposite sides of the gear for frictionally gripping it to cause said gear to normally rotate the chuck, said chuck having a portion threaded, and a nut engaged with said threads and screwing on to the portion in the direction of rotation of the chuck, said nut operating on one of the elements and being automatically turned on said chuck by the latter's intermittent change of speed of rotation to maintain said frictional engagement and take up wear.

In testimony whereof, I affix my signature.

AUGUST H. KATTERJOHN.